United States Patent
Jecker

(10) Patent No.: US 12,384,359 B2
(45) Date of Patent: *Aug. 12, 2025

(54) METHOD FOR MEASURING A LATERAL SURROUNDINGS OF A VEHICLE, MEASURING APPARATUS, AND VEHICLE

(71) Applicant: Valeo Schalter und Sensoren GmbH, Bietigheim-Bissingen (DE)

(72) Inventor: Nicolas Jecker, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 192 days.

This patent is subject to a terminal disclaimer.

(21) Appl. No.: 18/248,332

(22) PCT Filed: Sep. 23, 2021

(86) PCT No.: PCT/EP2021/076201
§ 371 (c)(1),
(2) Date: Apr. 7, 2023

(87) PCT Pub. No.: WO2022/073771
PCT Pub. Date: Apr. 14, 2022

(65) Prior Publication Data
US 2023/0373470 A1    Nov. 23, 2023

(30) Foreign Application Priority Data

Oct. 7, 2020   (DE) ................ 10 2020 126 165.9

(51) Int. Cl.
*B60W 30/06*    (2006.01)

(52) U.S. Cl.
CPC ........ *B60W 30/06* (2013.01); *B60W 2420/54* (2013.01); *B60W 2520/12* (2013.01)

(58) Field of Classification Search
CPC ............. B60W 30/06; B60W 2420/54; B60W 2520/12; B62D 15/0285; G01S 2015/465;
(Continued)

(56) References Cited

U.S. PATENT DOCUMENTS

| 4,398,423 A | * | 8/1983 | Takahashi | .......... G01N 29/4454 73/901 |
| 2007/0083119 A1 | * | 4/2007 | Adachi | ................ A61B 8/4483 600/437 |
| 2023/0375702 A1 | * | 11/2023 | Jecker | .................... G08G 1/168 |

FOREIGN PATENT DOCUMENTS

| DE | 10 351 314 A1 | 5/2004 |
| DE | 10361315 A1 | 7/2005 |

(Continued)

OTHER PUBLICATIONS

International Search Report issued in Application No. PCT/EP2021/076201 mailed on Dec. 22, 2021 (6 pages).
(Continued)

*Primary Examiner* — Daryl C Pope
(74) *Attorney, Agent, or Firm* — Osha Bergman Watanabe & Burton LLP

(57) ABSTRACT

A method for measuring lateral surroundings of a vehicle provided with a lateral ultrasonic transceiver is disclosed.
(Continued)

The method involves actuating the ultrasonic transceiver at at least two transmission and reception positions along a lateral direction for the purpose of transmitting a respective transmission signal in a transverse direction across the direction of travel and receiving a respective received signal characteristic reflected from the lateral surroundings; identifying a number of echo signals in the respective received signal characteristic; trilaterating a bearing of a first reflection point in the lateral surroundings, from which the chronologically first echo signals in the respective received signal characteristic were reflected; selecting an echo signal for a double echo determination; and determining a height of an object as being tall if a double echo is detected or short if no double echo is detected.

15 Claims, 10 Drawing Sheets

(58) Field of Classification Search
CPC .... G01S 2015/932; G01S 7/539; G01S 15/46; G01S 15/931
See application file for complete search history.

(56) References Cited

FOREIGN PATENT DOCUMENTS

| DE | 10 2005 044 050 A1 | 3/2007 |
| DE | 102007035219 A1 | 1/2009 |
| DE | 102014111125 A1 | 2/2016 |
| DE | 102017107386 A1 | 10/2018 |
| DE | 102017128983 A1 | 6/2019 |
| DE | 102018102786 A1 | 8/2019 |
| DE | 112017006255 B4 | 7/2020 |

OTHER PUBLICATIONS

Written Opinion issued in Application No. PCT/EP2021/076201 mailed on Dec. 22, 2021 (8 pages).
Park, et al., "Parking Space Detection Using Ultrasonic Sensor in Parking Assistance System", Intelligent Vehicles Symposium, IEEE, Piscataway, NJ, USA, Jun. 4, 2008, pp. 1039-1044 (6 pages).
Germany Search Report issued in Application No. 2019P02194DE mailed on Apr. 16, 2021 (6 pages).

* cited by examiner

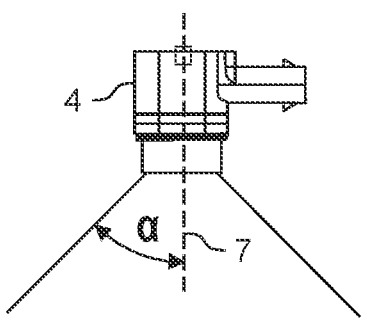
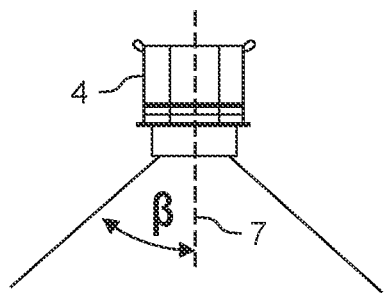
FIG. 2  FIG. 3
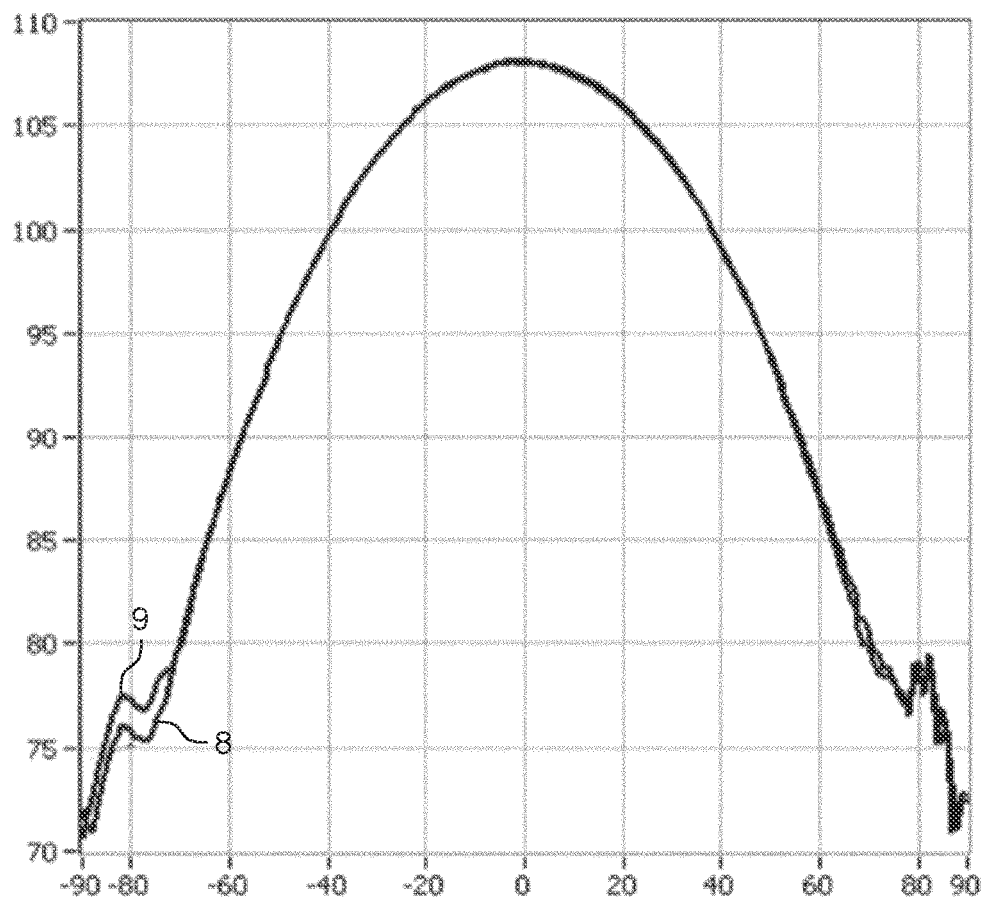
FIG. 4

METHOD FOR MEASURING A LATERAL SURROUNDINGS OF A VEHICLE, MEASURING APPARATUS, AND VEHICLE

The present invention relates to the field of parking assistance systems for motor vehicles and in particular to a method and a measuring apparatus for measuring lateral surroundings of a vehicle with a lateral ultrasonic transceiver and to a corresponding vehicle.

Modern vehicles have parking assistance systems that are configured to measure lateral surroundings of a vehicle, to identify a parking space and to park the vehicle in the parking space semi-automatically or fully automatically. One known method for measuring the lateral surroundings uses ultrasonic transceivers in order to determine the distance to objects in the lateral surroundings based on the times of flight between transmitting a transmission signal and receiving an associated echo signal.

DE 10 2005 044 050 A1 also teaches a method for determining parking spaces for motor vehicles, in which the height of the object in lateral surroundings of a motor vehicle is assessed based on whether a single echo signal is received in response to the transmission of a transmission signal or two echo signals, forming a double echo.

Building on this idea, DE 10 2007 035 219 A1 teaches the practice of generating an object classification signal on the basis of a number of local maxima in a received signal.

DE 10 351 314 A1 teaches a method for determining the bearing of a reflection point on an object in lateral surroundings of a motor vehicle. A respective transmission signal is transmitted at two different positions, an associated echo signal is received and a respective distance is determined. Based on the two distance measurements and the distance between the two positions, a precise bearing of the object is then calculated using the triangulation or trilateration method.

Against this background, an object of the present invention is to improve the measurement of lateral surroundings of a vehicle.

Accordingly, a first aspect proposes a method for measuring lateral surroundings of a vehicle provided with at least one lateral ultrasonic transceiver. The method comprises the steps of: a) actuating the at least one ultrasonic transceiver at at least two transmission and reception positions along a lateral direction, which is a direction of travel of the vehicle, for the purpose of transmitting a respective transmission signal in a transverse direction across the direction of travel and receiving a respective received signal characteristic reflected from the lateral surroundings; b) identifying a number of echo signals in the respective received signal characteristic; c) trilaterating a bearing of a first reflection point in the lateral surroundings, from which the chronologically first echo signals in the respective received signal characteristic were reflected; d) selecting, from the number of echo signals in one of the received signal characteristics, an echo signal for a double echo determination according to at least the bearing of the first reflection point relating to the chronologically first echo signals that was trilaterated in step c); e) determining whether the selected echo signal forms a double echo with any further, chronologically subsequent echo signal; and f) determining a height of an object in the lateral surroundings at a reflection point at which the selected echo signal was reflected as being tall if a double echo is detected in step e), and as being short if no double echo is detected.

In particular, therefore, the double echo determination is not always performed using the first and second echo signals. Rather, at least one trilaterated position of a first reflection point, from which the chronologically first echo signals in the respective received signal characteristic were reflected, is taken as a basis for deciding which of multiple echo signals in the respective received signal characteristic is used to perform the double echo determination. This advantageously allows an obstacle that is set back in the lateral surroundings, is located between other obstacles in the lateral surroundings and is shadowed by said obstacles to be made visible or measurable.

Measuring lateral surroundings of the vehicle should be understood to mean in particular the determination of heights and bearings of objects or reflection points on the objects in the lateral surroundings of the vehicle.

The lateral ultrasonic receiver is in particular an apparatus that is configured to transmit ultrasonic signals or ultrasonic signal characteristics into the lateral surroundings of the vehicle and to receive them therefrom.

A "lateral direction" should be understood in the present case to mean a direction along a direction of travel of the vehicle, or a direction along a front-rear axis of the vehicle. A "transverse direction" should be understood in the present case to mean in particular a direction that runs across the lateral direction. In particular, the transverse direction is perpendicular to the lateral direction.

The transmission signal transmitted by the ultrasonic transceiver may in particular be a signal lobe. "Transmitting a transmission signal in a transverse direction" can thus be understood to mean in particular that a maximum of a signal intensity of the transmitted ultrasonic signal is transmitted in the transverse direction. The signal intensity may drop laterally. This means that the transmitted transmission signal can be transmitted in an angular range of for example 30, 60, 90, 120 or up to 180° or any other value between 0 and 180°, the maximum of the signal intensity being transmitted in the transverse direction.

A "signal" should be understood in the present case to mean in particular a signal pulse, the temporal extent of which is defined by the temporal position of a maximum of a signal intensity and a width of the signal pulse around the maximum. By contrast, a "signal characteristic" should be understood to mean in particular a characteristic of signal intensities that is transmitted or received over a longer period of time. A signal characteristic can comprise one or more signals or signal pulses.

An "echo signal" should be understood to mean in particular a reflection of a previously transmitted transmission signal from the lateral surroundings of the vehicle.

In particular, a transmission signal or transmission signal pulse is transmitted at a respective transmission position at a transmission time. A received signal characteristic is received at a respective reception position over a specific reception period. One or more echo signals are then identified in said characteristic.

The proposed method can be carried out, for example, using two ultrasonic transceivers when the vehicle is stationary. In this case, a respective transmission position and a respective reception position may be identical, and the term "transmission and reception position" denotes the transmission position and the reception position identical thereto. The "direction of travel" in this case may denote the front-rear direction of the vehicle.

The method can also be carried out particularly advantageously using a single ultrasonic transceiver when the vehicle is moving. In this case, the term "transmission and reception positions" denotes multiple positions in a section along the lateral direction or direction of travel of the vehicle from the transmission of the transmission signal to the completion of the reception of the echo signal characteristic. In this case too, however, an unambiguous transmission position may be identified for each transmission signal and a reception position for the respective echo signal may be determined for each identified echo signal. This can be accomplished in particular on the basis of a time of reception of the echo signal in conjunction with speed data delivered by an odometry unit.

The number of echo signals can be "identified" in parallel with the reception of the respective received signal characteristic or subsequently. In particular, the respective received signal characteristic can be buffer-stored. The identification can take place based on the occurrence of maxima in the amplitudes (signal intensities) in the respective received signal characteristic. In particular, a predetermined or variable threshold can be applied and an echo signal can be identified if the amplitude (signal intensity) in the respective received signal characteristic exceeds the threshold.

Trilateration should be understood to mean in particular that the bearing of the reflection point is determined based on the time differences between the transmission of the respective transmission signal and the reception of the respective chronologically first echo signal and based on a distance between the respective transmission and reception positions. The measured time difference between the transmission of a transmission signal and the reception of a chronologically first echo signal makes it possible in particular to determine a distance from the associated transmission and reception position to the reflection point by multiplying half the time difference by the speed of sound. The bearing of the reflection point is then obtained in particular as the point of intersection between a circle around the first transmission and reception position having the first determined distance as radius and a circle around the second transmission and reception position having the second determined distance as radius.

The "selected echo signal" is in particular the echo signal that is initially hypothetically assumed to be an echo signal that was reflected in the lateral surroundings directly, i.e. only once, and returned to the ultrasonic transceiver by a direct route. The "chronologically subsequent" echo signal is in particular the next echo signal, i.e. the next pulse or maximum found in the same echo signal characteristic. In particular, there is no further echo signal in the same echo signal characteristic between the selected echo signal and the chronologically subsequent echo signal.

The chronologically subsequent echo signal is initially hypothetically assumed to be an echo signal that was reflected in the lateral surroundings indirectly, i.e. multiple times, and thus returned to the ultrasonic transceiver by an indirect route.

If it can then be determined that the chronologically subsequent echo signal and the selected echo signal are associated with one another, i.e. reflected from the same obstacle, it is determined that the obstacle is tall. For example, the obstacle could be a vehicle or a house wall, the selected echo signal can be an echo signal that was reflected to the ultrasonic transceiver directly, and the chronologically subsequent echo signal can be an echo signal was reflected by an indirect route first from the obstacle to the ground and then from the ground to the ultrasonic transceiver. On the other hand, if there is no double echo, it is determined that the obstacle at which the reflection point from which the selected echo signal was reflected is located is short.

In this case, "tall" should be understood to mean in particular a height at which an object or obstacle in the lateral surroundings should not be driven over or touched when parking. "Short" should be understood to mean in particular a height at which an object or obstacle in the lateral surroundings may be driven over when parking, that is to say in particular and for example a typical height of a curb of at most 15 cm, for example.

Whether such a double echo is formed can be determined on the basis of an interval of time between the selected echo signal and the chronologically subsequent echo signal and/or on the basis of signal properties of the respective echo signals such as signal intensity ratios, signal shapes and the like.

According to the proposed method, which of the multiple echo signals in the echo signal characteristic is selected as the selected echo signal is selected on the basis of the trilaterated bearing of the reflection point of the first echo signal.

Thus, depending on the trilaterated bearing of the reflection point of the first echo signal, the double echo determination can be carried out for example either on the basis of the first and second echo signals or on the basis of chronologically later echo signals, such as on the basis of the chronologically second and the chronologically third echo signal.

This advantageously allows an obstacle that is set back and is shadowed by another obstacle in the lateral surroundings to be made visible.

According to one embodiment, the proposed method involves step c) comprising trilaterating at least one bearing of a second reflection point in the lateral surroundings, from which the chronologically second echo signals in the respective received signal characteristic were reflected, and the selection of an echo signal for a double echo determination in step d) and/or the determination of whether the selected echo signal forms a double echo with a further, chronologically subsequent, echo signal in step e) is performed according to the bearing of the reflection point of the selected echo signal that was trilaterated in step c) and/or according to the bearing of the reflection point of the chronologically subsequent echo signal that was trilaterated in step c).

In particular, step c) can comprise trilaterating one or more bearings of one or more further reflection points in addition to the bearing of the first reflection point. In particular, step c) can comprise trilaterating the bearing of the first reflection point, the bearing of the second reflection point, the bearing of a third reflection point and/or the bearing of a fourth reflection point. Particularly preferably, step c) can comprise trilaterating an associated n-th reflection point, where n is an integer of 1 or more, for two received signal characteristics for each n-th echo signal in one of the two received signal characteristics for which an n-th echo signal according to the time sequence of the echo signals in the respective received signal characteristic was identified in the other received signal characteristic. Accordingly, the selection of an echo signal for a double echo determination in step d) and, if necessary, the determination of whether the selected echo signal forms a double echo with a further, chronologically subsequent, echo signal in step e) is then performed according to the bearing of the first, second, third and/or fourth reflection point of the selected echo signal that was trilaterated in step c) and optionally according to the bearing of the reflection point of the chronologically subsequent echo signal that was trilaterated in step c), which then corresponds to the second, third, fourth or fifth reflection point.

By trilaterating the other reflection points, it may be possible to avoid shadowing and erroneous double echo determinations even more reliably.

According to a further embodiment, step d) comprises selecting, for a respective double echo determination, an echo signal in the one received signal characteristic for whose associated reflection point a bearing that is not laterally offset in relation to the associated transmission and reception position of the one received signal characteristic was trilaterated in step c).

A bearing of a reflection point is regarded as "laterally offset" in relation to a transmission and reception position in particular if it deviates from a transverse axis of the ultrasonic transceiver running through the transmission and reception position by more than a tolerance interval. A bearing of a reflection point is regarded as "not laterally offset" in relation to a transmission and reception position in particular if it deviates from a transverse axis of the ultrasonic transceiver running through the transmission and reception position by no more than the tolerance interval. The tolerance interval can be determined on the basis of one or more speeds of travel of the vehicle, a distance between the vehicle and the lateral surroundings in which obstacles are suspected, a frequency of transmission of transmission signals, and the like.

Thus, in particular echo signals returning to the ultrasonic transceiver from an oblique direction from reflection points on laterally offset obstacles that are at the side compared with the transverse axis of the ultrasonic transceiver, even before an echo signal from a reflection point along the transverse axis arrives at the ultrasonic transceiver, cannot be used for the double echo determination, and the echo signals arriving later in time from the obstacle situated in the transverse direction can advantageously be used for the double echo determination and subsequent height determination.

This can advantageously be used to prevent an obstacle in a set back position from being shadowed by other, laterally offset obstacles.

According to a further embodiment, step d) comprises selecting the chronologically second echo signal in the one received signal characteristic for a double echo determination if the bearing of the first reflection point that was trilaterated in step c) is laterally offset in relation to the associated transmission and reception position of the one received signal characteristic; and otherwise selecting the chronologically first echo signal.

In practice, depending on the ultrasonic transceiver used and the other circumstances of the driving situation, it may sometimes be difficult to trilaterate further reflection points with sufficient accuracy on the basis of further echo signals that are chronologically subsequent to a first echo signal. Therefore, according to the present embodiment, only and exclusively the bearing of the first reflection point is trilaterated on the basis of the respective chronological echo signal in the two echo signal characteristics.

The inventors have recognized that typical shadowing when measuring parking spaces in lateral surroundings of a vehicle can be effectively eliminated simply by performing the double echo determination and height determination with the second echo signal as the selected echo signal and the third echo signal as a candidate for a possible double echo determination if the first reflection point is laterally offset. Trilateration of the further reflection points can advantageously be dispensed with and, in particular, for the purpose of determining the bearing of the second reflection point, it can be assumed that the second and third echo signals have been reflected essentially along the tangential axis of the ultrasonic transceiver.

It is true that even at a tall, laterally offset obstacle, both a single reflection, i.e. a reflection only by the obstacle, and a double reflection, i.e. a reflection by the obstacle and by the ground, take pace. In practice, however, the latter often either does not find its way back to the ultrasonic transceiver and/or is no longer identified as an independent echo signal there because the signal intensity is too low.

According to a further embodiment, step e) comprises detecting the double echo only on the condition that a bearing that is not laterally offset in relation to a bearing that was trilaterated in step c) for the reflection point associated with the selected echo signal was trilaterated in step c) for the reflection point associated with the chronologically subsequent echo signal.

A bearing of a reflection point associated with the chronologically subsequent echo signal is considered to be "laterally offset" in relation to a trilaterated bearing of a reflection point of the selected echo signal in particular if the two bearings deviate from one another by more than a tolerance interval. The two bearings are considered to be "not laterally offset" in particular if they deviate from one another by no more than the tolerance interval. The tolerance interval can be determined on the basis of one or more speeds of travel of the vehicle, a distance between the vehicle and the lateral surroundings in which obstacles are suspected, a frequency of transmission of transmission signals, and the like.

If the conditions allow a trilateration of chronologically subsequent echo signals, the present embodiment can advantageously prevent an echo signal reflected from a first direction and a chronologically subsequent echo signal, but reflected from a second, different direction, from being incorrectly identified as a double echo relating to one and the same reflection point. It is thus possible to prevent shadowing and superimposition effects of echo signals reflected by different obstacles or objects in the lateral surroundings.

According to a further embodiment, step d) comprises selecting the chronologically second echo signal in the one received signal characteristic for a double echo determination if the bearing of the first reflection point that was trilaterated in step c) is laterally offset in relation to the associated transmission and reception position of the one received signal characteristic; and otherwise selecting the chronologically first echo signal.

The inventors have recognized in particular that a significant improvement in the measurement can be achieved in the case of a shadowing position that occurs in practice simply by considering forming the double echo on the basis of the chronologically second and the chronologically third echo signal of a received signal characteristic if a laterally offset bearing is trilaterated for the chronologically first echo of the received signal characteristic.

In particular, a trilateration of bearings of reflection points on the basis of echo signals that are chronologically subsequent to a chronologically first echo signal can prove to be more difficult than the trilateration on the basis of the chronologically first echo signals.

According to the present embodiment, an improvement for a shadowing problem can advantageously be achieved without trilaterating the bearings of chronologically second, third, and so on, reflection points from which the chronologically second, third, and so on, echo signals were reflected.

According to a further embodiment, step e) comprises detecting the double echo only if the interval of time between the selected echo signal and the chronologically subsequent echo signal in the one received signal characteristic is less than a predetermined maximum interval.

The predetermined maximum interval may be determined taking into account an expected lengthening of the path of a doubly reflected echo signal compared to a directly reflected echo signal. The expected lengthening of the path depends in particular on an installation height of the ultrasonic transceiver and an expected distance between the vehicle and the object to be measured. For example, a lengthening of the path by 50 cm, taking into account the speed of sound of 343 m/s, results in a time difference of around 1.5 ms. The predetermined maximum interval may be selected in a range between 1 and 2 ms, and preferably as 2 ms.

It is thus possible to effectively prevent an erroneous determination of a double echo on the basis of echo signals that were reflected by different reflection points.

According to a further embodiment, step e) comprises detecting the double echo only if a signal strength of the chronologically subsequent echo signal is not higher than a signal strength of the selected echo signal and deviates from the signal strength of the selected echo signal by no more than a predetermined factor.

It is thus possible to effectively prevent an erroneous determination of a double echo on the basis of echo signals that were reflected by different objects.

According to a further embodiment, a tolerance interval for a respective determination of whether or not a respective trilaterated bearing is laterally offset is selected on the basis of a speed of travel of the vehicle.

Just as an example, it will be assumed that the vehicle is travelling past the lateral surroundings at 30 km/h. Taking into account the speed of sound of 343 m/s and the typical distance from obstacles or parking spaces at the side of the road, 40 ms before the received signal characteristic is received in full are estimated for the transmission of a transmission signal. The result of this is that a measurement (transmission of the transmission signal and reception of the received signal characteristic) takes place every 33 cm. In this respect, a bearing of a reflection point can be considered to be laterally offset in this example if its lateral bearing differs from the lateral bearing of the ultrasonic transceiver at the transmission and reception position by more than a tolerance interval of 15 to 20 cm, for example, or if the bearing of the reflection point is spaced from the transverse axis of the ultrasonic transceiver at the transmission and reception position by more than the tolerance interval of 15 to 20 cm.

It is thus advantageously possible to compensate for inaccuracies that occur in practice during trilateration, noise problems, etc., by assuming that there is no lateral offset while the lateral offset is smaller than the tolerance interval.

According to a further embodiment, the proposed method further comprises g) determining a bearing of the object whose height was determined in step f) on the basis of a time difference between the reception of the selected echo signal in the one received signal characteristic and the transmission of the associated transmission signal, and on the basis of the transverse direction across the direction of travel of the vehicle.

In particular, it is assumed in the present embodiment that as a result of the selection of an echo signal in step e) in light of the bearing of at least the first reflection point, the object whose height was determined on the basis of the echo signal selected in this way and the chronologically subsequent echo signal is not laterally offset in relation to the transmission and reception position of the ultrasonic transceiver, i.e. is arranged substantially in the region of a transverse axis of the ultrasonic transceiver.

It is thus advantageously possible to meaningfully determine the bearing of a second or further reflection point and of the associated object even if only the first reflection point is trilaterated on the basis of the first echo signals, but the double echo determination and the height determination are performed on the basis of second and/or further echo signals.

According to a further embodiment, the proposed method further comprises g) determining a bearing of the object whose height was determined in step f) as the bearing of the reflection point from which the selected echo signal was reflected that was trilaterated in step c).

However, if the bearing of the reflection point from which the selected echo signal was reflected is trilaterated, the present embodiment can advantageously involve the bearing of the associated object being determined even more exactly.

A second aspect proposes a method for parking a vehicle that is provided with at least one lateral transceiver and a parking assistance system. The method comprises: performing the method of the first aspect repeatedly at multiple locations along a direction of travel parallel to lateral surroundings of the vehicle in order to determine the bearings and heights of one or more objects in the lateral surroundings of the vehicle; determining a parking space in the lateral surroundings that is free of objects that were determined as being tall; and parking the vehicle in the parking space using the parking assistance system.

The parking assistance system may be configured to give tips or instructions to a human driver of the vehicle to carry out appropriate steering and driving procedures. The parking assistance system may also be configured in particular for semi-autonomous or fully autonomous driving of the vehicle. Semi-autonomous driving is understood to mean for example that the parking assistance system controls a steering apparatus and/or an automatic gear selection system. Fully autonomous driving is understood to mean for example that the parking assistance system additionally also controls a drive device and a braking device.

The parking assistance system may in particular cause the vehicle to travel past along a direction of travel parallel to the lateral surroundings of the vehicle in which a parking space is suspected at a speed of preferably no more than 40 km/h, particularly preferably no more than 30 km/h and quite particularly preferably at walking speed and to repeatedly carry out the proposed method in the process.

The multiple bearings and heights ascertained by repeatedly performing the method of the first aspect may be combined, or clustered using a clustering method. Statistical criteria can be used to filter out incorrect determinations, or less relevant determinations, and/or to ascertain which of the determined bearings and heights are associated with identical or different objects.

A parking space may be understood to mean in particular an area in the lateral surroundings of the vehicle in which no objects determined as being tall are arranged and the dimensions of which are larger than the dimensions of the vehicle, meaning that it is possible to park the vehicle parallel, diagonally or transversely in the free area.

The parking trajectory may be ascertained mathematically and/or using machine learning, a trained neural network or the like.

The vehicle may be caused to travel along the parking trajectory using a PID controller or the like. While it is travelling, further ultrasonic measurements according to the proposed method of the first aspect or further measurements using other types of sensors may be performed in order to continuously update the information obtained about the lateral surroundings.

A third aspect proposes a computer program product comprising instructions that, when executed by a computer apparatus, cause the latter to carry out the method according to the first or second aspect.

A computer program product, such as e.g. a computer program means, may be provided or supplied for example as a storage medium, such as e.g. a memory card, USB stick, CDROM, DVD, or else in the form of a downloadable file from a server in a network. This may take place, for example, in a wireless communication network by transmitting a corresponding file containing the computer program product or the computer program means.

The computer apparatus may in particular be part of the parking assistance system. The computer apparatus may be an embedded device, a control unit (ECU—electronic control unit) of the vehicle, a microcontroller, an industrial PC or the like.

A fourth aspect proposes a measuring apparatus for a parking assistance system of a vehicle provided with at least one lateral ultrasonic transceiver, wherein the measuring apparatus is configured to measure lateral surroundings of the vehicle and comprises: a) a first unit configured to actuate the at least one ultrasonic transceiver at at least two transmission and reception positions along a lateral direction, which is a direction of travel of the vehicle, for the purpose of transmitting a first or second transmission signal in a transverse direction across the direction of travel and receiving a respective first or second received signal characteristic reflected from the lateral surroundings; b) a second unit configured to identify a number of echo signals in the respective received signal characteristic; c) a third unit configured to trilaterate a bearing of a first reflection point in the lateral surroundings, from which the chronologically first echo signals in the respective received signal characteristic were reflected; d) a fourth unit configured to select, from the number of echo signals in one of the received signal characteristics, a selected echo signal for a double echo determination according to at least the bearing of the first reflection point relating to the chronologically first echo signals that was trilaterated by the third unit; e) a fifth unit configured to determine whether the selected echo signal forms a double echo with any further, chronologically subsequent echo signal; and f) a sixth unit configured to determine a height of an object in the lateral surroundings at a reflection point at which the selected echo signal was reflected as being tall if the fifth unit has detected a double echo, and as being short if the fifth unit has detected no double echo.

The features, advantages and embodiments described for the method of the first aspect also apply correspondingly to the measuring apparatus of the fourth aspect.

Each of the units mentioned here may be implemented in hardware and/or software. In the case of an implementation in hardware, the applicable unit may be in the form of a computer or a microprocessor, for example. In the case of an implementation in software, the applicable unit may be in the form of a computer program product, a function, a routine, an algorithm, part of a program code or an executable object. Furthermore, each of the units mentioned here may also be in the form of part of a superordinate control system of the vehicle, such as for example a control unit (ECU: engine control unit).

A fifth aspect proposes a vehicle having a parking assistance system that is configured for semi-autonomous or fully autonomous driving of the vehicle, wherein the vehicle and/or the parking assistance system comprises the measuring apparatus of the fourth aspect.

The vehicle is for example an automobile or a truck. Preferably, the vehicle comprises a number of sensor units which are configured to record the driving state of the vehicle and to record an environment of the vehicle. Examples of such sensor units of the vehicle are image capture devices, such as a camera, a radar (radio detection and ranging) or a lidar (light detection and ranging), ultrasonic sensors, location sensors, wheel angle sensors and/or wheel speed sensors. The sensor units are in particular each configured to output a sensor signal, for example to the parking assistance system, which carries out the semi-autonomous or fully autonomous driving on the basis of the recorded sensor signals.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred exemplary embodiments with reference to the accompanying figures.

FIG. 2 shows a schematic view of an ultrasonic transceiver from a bird's eye perspective;

FIG. 3 shows a schematic view of the ultrasonic transceiver viewed along a vehicle longitudinal direction;

FIG. 4 shows a plot of an intensity of a transmission signal transmitted by the ultrasonic transceiver;

Identical or functionally identical elements have been provided with the same reference signs in the figures, unless stated otherwise.

Basic configurations and principles for determining distance, bearing and height in lateral surroundings of a vehicle are explained by way of illustration and may apply to all embodiments and exemplary embodiments of the invention.

Figure 1:
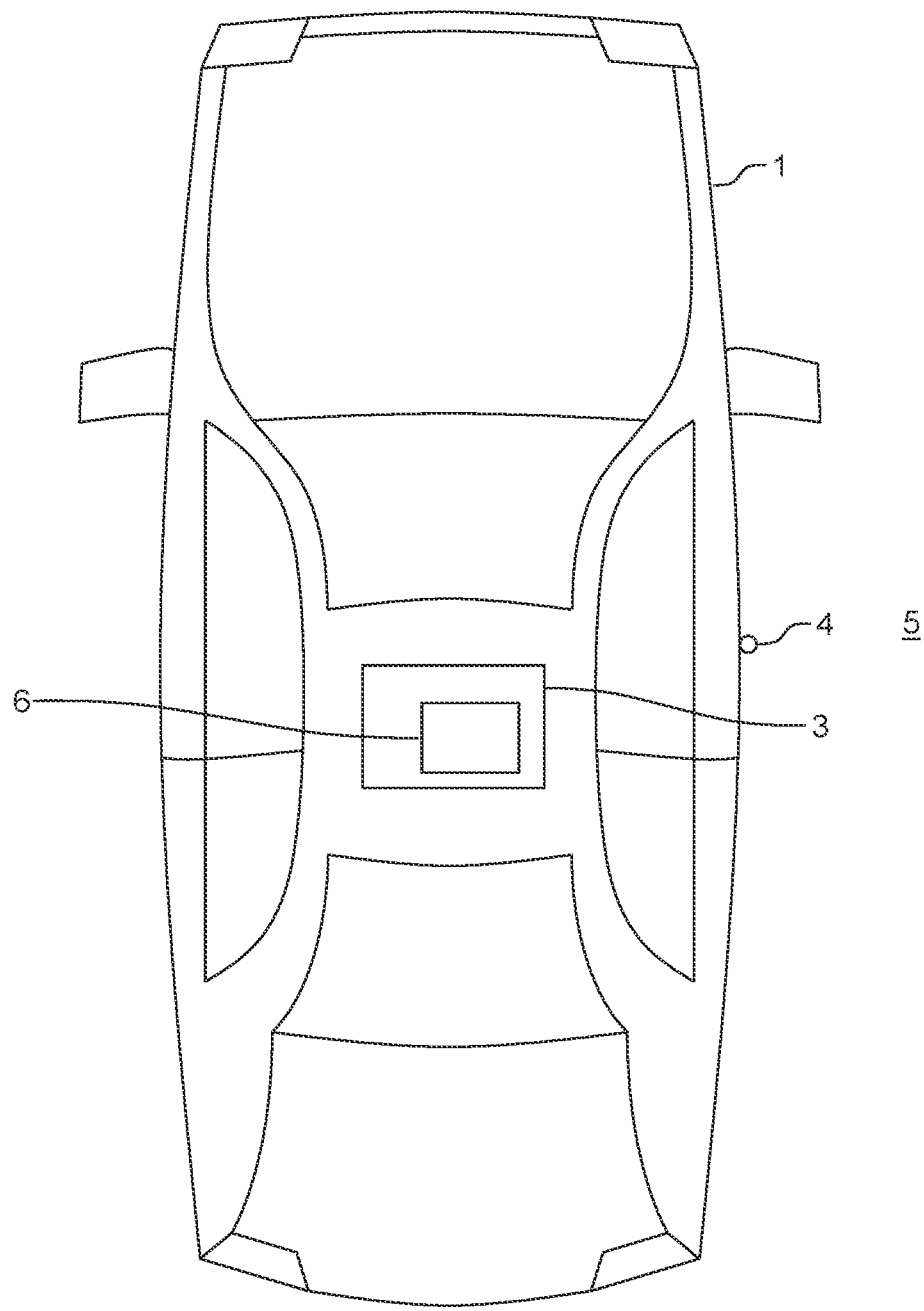
FIG. 1 shows a schematic view of a vehicle from a bird's eye perspective.

FIG. 1 shows a schematic view of a vehicle 1 from a bird's eye perspective. The vehicle 1 is for example a car that is arranged in surroundings 2. The car 1 has a parking assistance system 3 which is in the form of a control device, for example. A plurality of environment sensor devices (not all are shown) are also arranged on the car 1. The plurality of environment sensor devices comprises in particular a lateral ultrasonic transceiver 4. The ultrasonic transceiver 4 is configured to transmit an ultrasonic transmission signal into the surroundings 2, and specifically into an area of the surroundings 2 of the vehicle 1 that is referred to as lateral surroundings 5, and to receive an ultrasonic received signal characteristic from the lateral surroundings 5. The parking assistance system 3 comprises in particular a measuring apparatus 6. The measuring apparatus 6 is configured to determine the bearings and heights of objects (obstacles) in the lateral surroundings 5 using the ultrasonic transceiver 4 according to the proposed method and to output them to the parking assistance system 3. Using the sensor signals recorded by the environment sensor devices and the bearings and heights determined by the measuring apparatus 3, the parking assistance system 2 is able to drive the car 1 semi-autonomously or fully autonomously, and in particular to park it in a parking space (not shown) in the lateral surroundings 5. Besides the ultrasonic transceiver 4 illustrated in FIG. 1, there may be provision for the vehicle 1 to have further sensor devices. Examples of these are further ultrasonic transceivers, optical sensors, visual cameras, a radar and/or a lidar, a microphone, an acceleration sensor, an antenna with a coupled receiver for receiving electromagnetically transmittable data signals, and the like.

FIG. 2 shows a schematic view of an ultrasonic transceiver 4 from a bird's eye perspective, FIG. 3 shows a schematic view of the ultrasonic transceiver 4 viewed along a vehicle longitudinal direction, and FIG. 4 shows a plot of an intensity of a transmission signal transmitted by the ultrasonic transceiver 4.

The ultrasonic transceiver 4 transmits a transmission signal along a transverse axis 7. When the ultrasonic transceiver 4 is arranged as a lateral ultrasonic transceiver 4 on one side of the vehicle 1 (FIG. 1), the transverse axis 7 is arranged across the vehicle 1 (FIG. 1), that is to say across a front-to-rear direction or longitudinal direction of the vehicle 1 (FIG. 1). The transmitted transmission signal comprises a signal lobe, i.e. it has an apex angle $\alpha$ in the horizontal direction and an apex angle $\beta$ in the vertical direction. The cone defined by the apex angles $\alpha$ and $\beta$ describes a three-dimensional surface in which a signal intensity of the transmitted ultrasonic transmission signal is reduced by a predetermined factor compared to the maximum signal intensity on the transverse axis. In FIG. 4, an angle to the transverse axis is plotted on the x-axis and a signal intensity (sound pressure level in dB) is plotted on the y-axis. The curve 8 describes a characteristic of the signal intensity in a horizontal plane and the curve 9 describes the characteristic of the signal intensity in a vertical plane, the horizontal plane and the vertical plane each running through the transverse axis 7.

Figure 5:
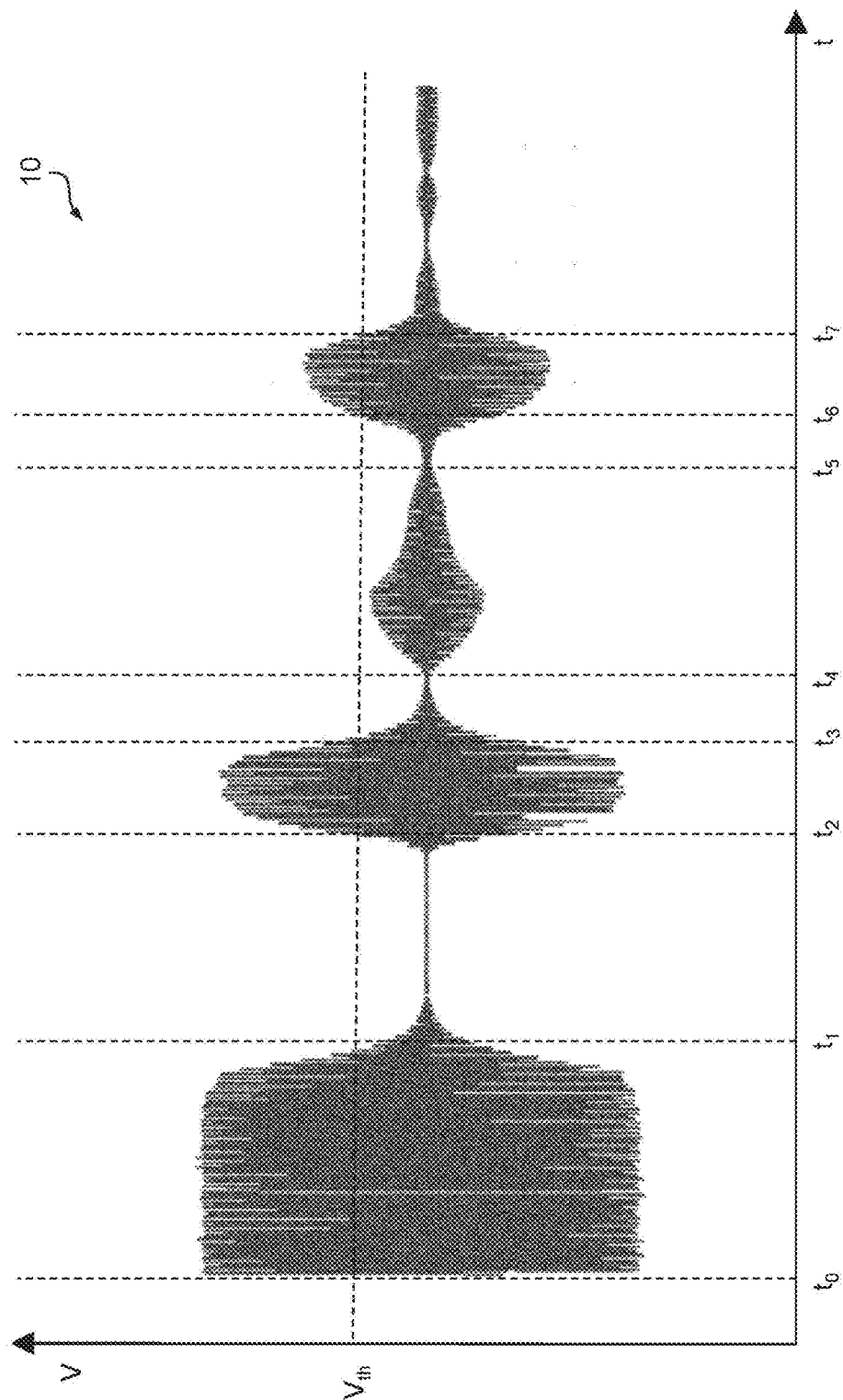
FIG. 5 shows a plot of a received signal characteristic.

Reference is made to FIG. 1 to FIG. 5. FIG. 5 shows a plot of a received signal characteristic 10 that is received by the ultrasonic transceiver 4 in response to the transmission of the transmission signal. The time t is plotted on the horizontal axis, and a sensor voltage output by the ultrasonic transceiver 4 is plotted on the vertical axis, this sensor voltage indicating a received signal intensity recorded by the ultrasonic transceiver 4, i.e. a recorded sound pressure.

At the time $t_0$, the ultrasonic transceiver 4 transmits a transmission signal. From the time $t_0$ to the time $t_1$, the ultrasonic transceiver immediately registers a reverberation of the transmitted transmission signal. The region of the received signal characteristic 10 from $t_0$ to $t_1$ therefore cannot contain any information about the lateral surroundings 5 of the vehicle 1, and is suppressed, for example. At the time $t_2$, the amplitude of the received signal intensity increases, since a first echo signal arrives from the lateral surroundings 5 of the vehicle 1. The time $t_2$ in the received signal characteristic 10 can be identified as the time of reception of the first echo signal in the received signal characteristic 10. At a time $t_4$, the amplitude of the received signal intensity increases again, but does not reach a threshold voltage $V_{th}$. The region from $t_4$ to $t_5$ therefore cannot be identified as an echo signal, but rather can be regarded as an interference signal. From the time $t_6$ to the time $t_7$, a second echo signal that exceeds the threshold voltage $V_{th}$ is received from the lateral surroundings 5 of the vehicle. The time to can thus be identified as the time of reception of a second echo signal in the received signal characteristic 10.

Figure 6:
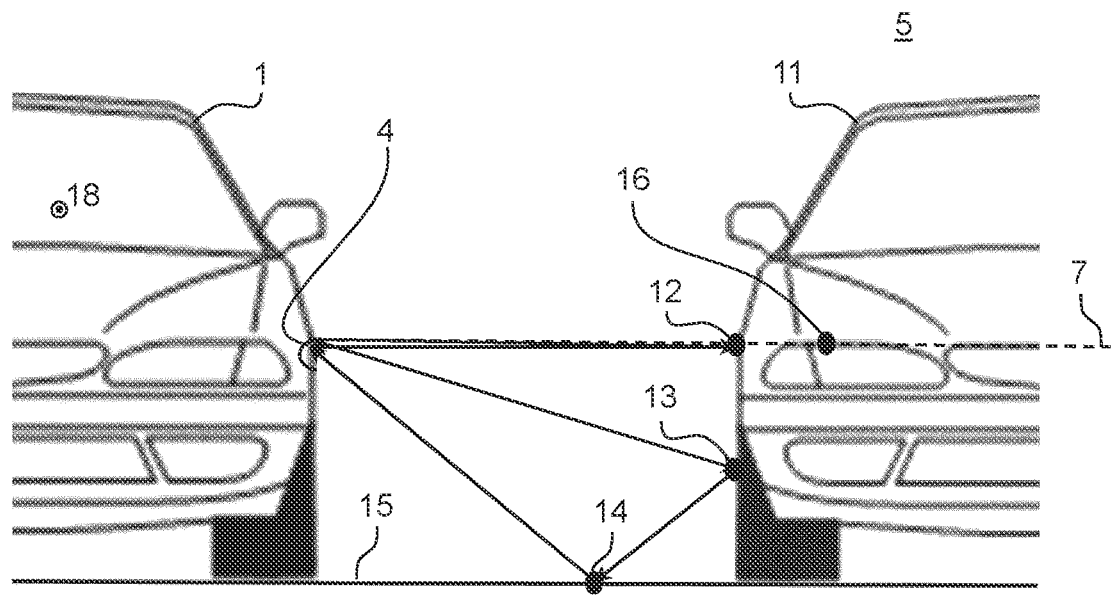
FIG. 6 shows a schematic depiction to illustrate the formation of a double echo in the case of a tall obstacle.
Figure 7:
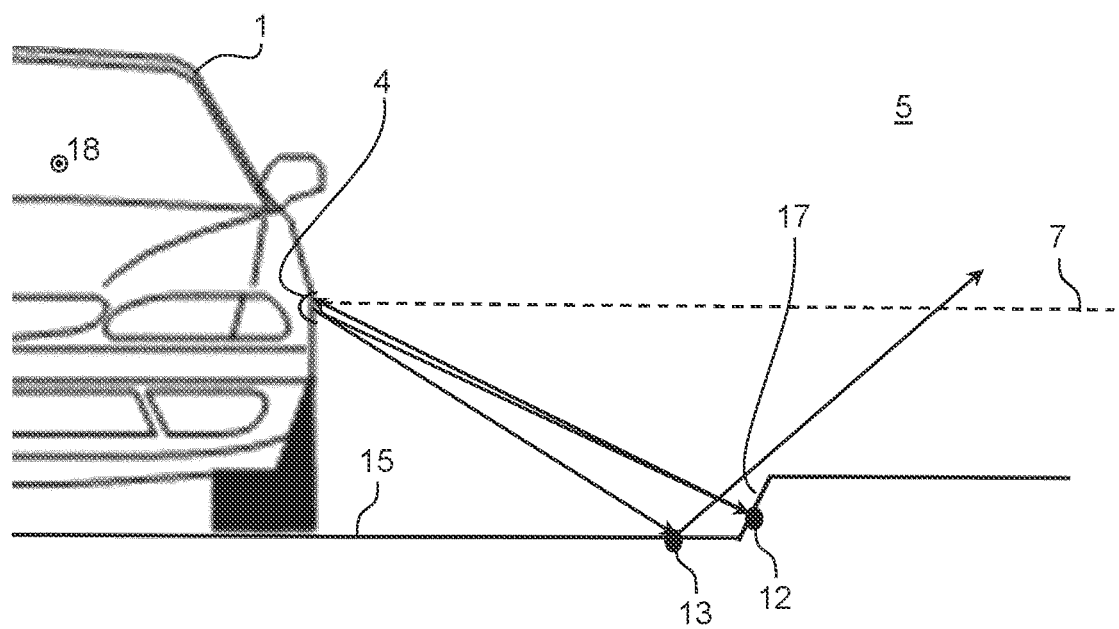
FIG. 7 shows a schematic depiction to illustrate the absence of a double echo in the case of a short obstacle.

FIG. 6 shows a schematic depiction to illustrate the formation of a double echo in the case of a tall obstacle, and FIG. 7 shows a schematic depiction to illustrate the absence of a double echo in the case of a short obstacle. FIG. 6 and FIG. 7 are described with reference back to FIGS. 5 and 1. Arrows in FIG. 6, 7 illustrate propagation paths for transmission and echo signals.

FIG. 6 shows how the vehicle 1 travels past a parked vehicle 11 (object, obstacle) along a lateral direction of travel 18. The transmission signal transmitted by the ultrasonic transceiver 4 at the time $t_0$ propagates along the transverse axis 7 of the vehicle 1 to a first point 12 on a surface of the parked vehicle 11, is reflected from there, and the reflected echo signal propagates back along the transverse axis 7 and reaches the ultrasonic transceiver 4 again at the time $t_2$. The distance between the ultrasonic transceiver 4 and the first point 12 can be determined by multiplying the time difference between $t_2$ and to by the speed of sound 343 m/s and then dividing by two. The first point 12 is thus a first reflection point 12, the distance of which is able to be determined based on the first echo signal occurring at the time $t_2$.

A further component of the signal lobe of the transmission signal propagates in a direction diverging from the transverse axis 7 to a second point 13 on the surface of the parked vehicle 11, is reflected from there, as second echo signal, to a third point 14 on a ground 15 and, from there, back to the transceiver 4 again, where it arrives at the time $t_6$. When evaluating the received signal characteristic 10, however, there is no information available about the actual course of the path of the incoming echo signals. Therefore, in the same way as described above for the first reflection point 12, a distance from a second, virtual reflection point 16 is determined, the bearing of which, as shown in FIG. 6, is assumed to be on the transverse axis 7 at a distance that corresponds to half the signal propagation time between transmission of the transmission signal at the time $t_0$ and arrival of the second echo signal at the time $t_6$.

The second reflection point 16 is also referred to as a "virtual" reflection point because a reflection did not actually take place at the distance from the ultrasonic transceiver 4 ascertained therefor—or at its bearing trilaterated therefor if a trilateration is performed, as described later. Rather, a distance or, as a result of trilateration, a bearing at which a reflection would have taken place if the associated echo signal had been reflected only once and not multiple times is determined for a virtual reflection point such as this.

FIG. 7 shows how the vehicle 1 travels past a curb 17 along a lateral direction of travel 18. A component of the signal lobe of the transmission signal transmitted at the time $t_0$ propagates from the ultrasonic transceiver 4 to a first point 12 on the curb 17, is reflected from there, and the reflected echo signal reaches the ultrasonic transceiver 4 at the time $t_2$. The first point 12 is thus a first reflection point 12, the distance of which is determined based on the first echo signal at $t_2$ in the same way as in the driving situation shown in FIG. 6. Although, similarly to what is shown in FIG. 6, there may be a double reflection here too from the curb 17 and then from the ground 15, in this case the time difference between the arrival of the doubly reflected echo signal and the echo signal that is reflected once is so small that both echo signals are identified in the received signal characteristic 10 as a single, first echo signal. A further component of the lobe of the transmission signal propagates to a second point 13 on the ground 15 and is reflected from there further away from the vehicle 1, without reaching the ultrasonic transceiver 4.

It can thus be determined that a tall obstacle 11 is present in the lateral surroundings 5 of the vehicle 1 if it is possible to identify two echo signals in the received signal characteristic 10 that satisfy specific criteria so as to form a double echo, whereas a short obstacle 17 is present in the lateral surroundings 5 if it is possible to identify only one echo signal and/or two echo signals in the received signal characteristic 10, but these do not satisfy the specific criteria.

A criterion for a double echo determination can be that the second echo signal has a lower intensity than the first echo signal. A further criterion can be that a time difference between the arrival of the second echo signal and the arrival of the first echo signal corresponds to an expected difference in length between a direct reflection path (4, 12, 4 in FIG. 6) and an indirect reflection path (4, 13, 14, 4 in FIG. 6). A maximum interval of time between two echo signals that results in a double echo being determined can preferably be set to 2 ms, which corresponds to a difference in length of the reflection paths of approx. 69 cm. In other words, in one example, a double echo can be determined only if the second, virtual reflection point 16 is no more than 34.5 cm behind the first reflection point 12.

For the sake of clarity, the text below also refers to two reflection points (for example the first reflection point 12 and the second, virtual reflection point 16 in FIG. 6) forming a double echo. However, such phrasing always means that the associated echo signals that were used to determine the distances from the relevant reflection points 12, 16 form a double echo.

Figure 8:
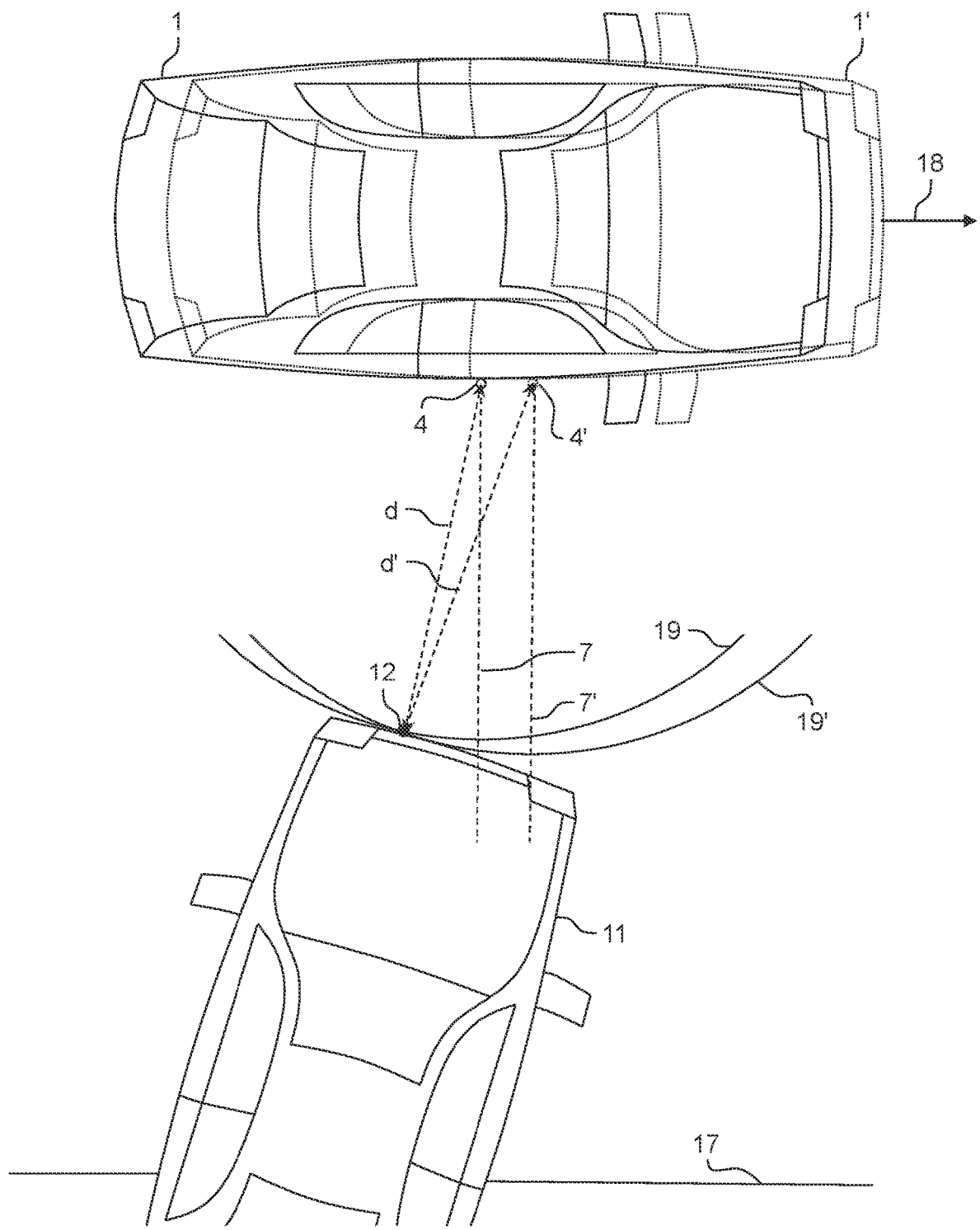
FIG. 8 shows a schematic depiction for illustrating trilateration.

FIG. 8 shows a schematic depiction to illustrate the trilateration of a bearing of a reflection point 12. FIG. 8 shows the vehicle 1, 1' while travelling, in a lateral direction 18, past a curb 17 (short obstacle, or object) on which a parked other vehicle 11 (tall obstacle, or object) is parked diagonally. The vehicle is shown with reference sign 1 at a first time and with reference sign 1' at a second time. The ultrasonic transceiver 4, 4' is accordingly shown with reference sign 4 at a first transmission and reception position at the first time and with reference sign 4' at a second transmission and reception position at the second time.

In the manner described above with reference to FIGS. 5 to 7, a transmission signal is transmitted at the first transmission and reception position of the ultrasonic transceiver 4 at the first time and a received signal characteristic is received, and a distance d from a first reflection point 12 from which the echo signal was reflected is determined on the basis of a time at which an echo signal is identified in the received signal characteristic. A distance d' from the first reflection point 12 is determined at the second transmission and reception position of the ultrasonic transceiver 4 at the second time in the same way. The bearing of the first reflection point 12 is then obtained as the point of intersection between a circle 19 having radius d around the first transmission and reception position with 4 as the center and a circle 19' having radius d' around the second transmission and reception position with 4' as the center. The driving situation shown in FIG. 8 thus results in a bearing for the reflection point 12 that is laterally offset with respect to the transverse axes 7, 7' of the ultrasonic transceiver 4, 4'. The trilateration thus makes it possible to improve the precision of the actual bearing of the reflection point 12 compared to an initially assumed bearing at a respective point of intersection between the transverse axes 7, 7' and the circles 19, 19'.

Figure 9:
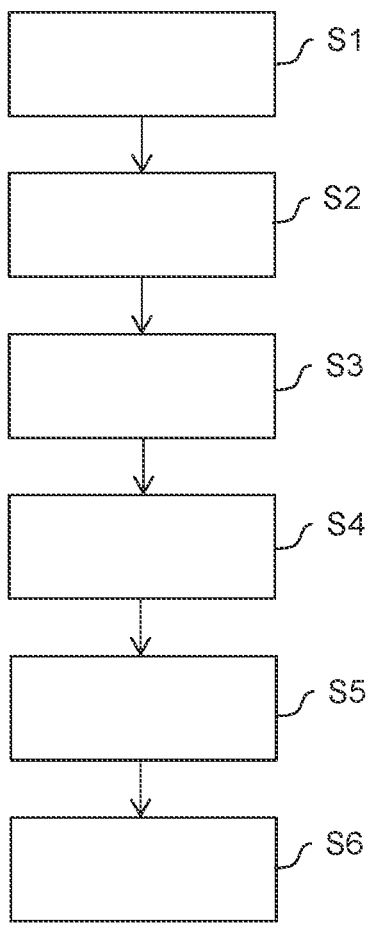
FIG. 9 shows a flowchart of a method for measuring lateral surroundings of the vehicle from FIG. 1 according to exemplary embodiments.
Figure 10:
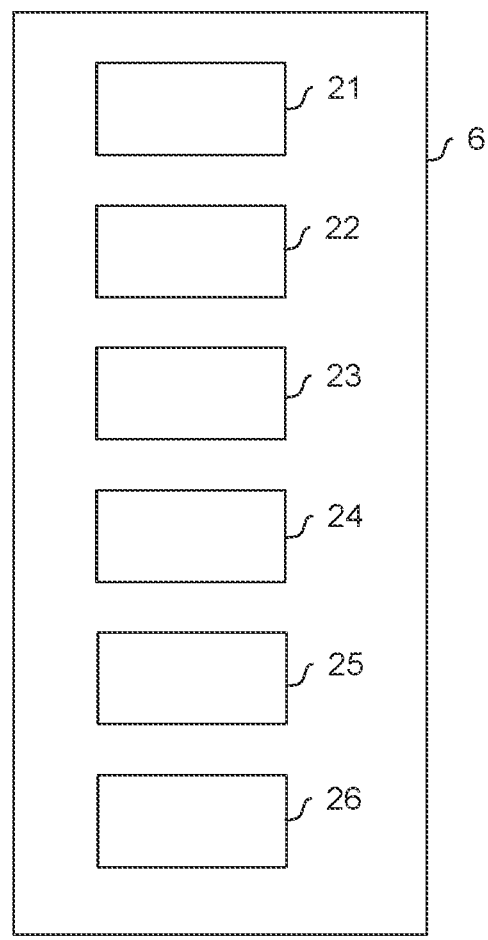
FIG. 10 shows a functional block diagram of a corresponding measuring apparatus according to exemplary embodiments.

FIG. 9 shows a flowchart of a method and FIG. 10 shows a functional block diagram of a measuring apparatus 6 for measuring the lateral surroundings 5 of the vehicle 1 according to exemplary embodiments. Reference is made to FIG. 9 and FIG. 10 in conjunction with FIG. 1 and FIG. 8.

The measuring apparatus 6 comprises first to sixth units 21-26. In step S1 of the proposed method, the first unit 21 of the measuring apparatus 6 actuates the ultrasonic transceiver 4 at a first transmission and reception position at 4 at a first time and thereby causes said transceiver to transmit a first transmission signal along the transverse axis 7 and to receive a first reflected received signal characteristic from the lateral surroundings 5. The first unit 21 actuates the ultrasonic transceiver 4' at a second transmission and reception position at 4' at a second time and thereby causes said transceiver to transmit a second transmission signal along the transverse axis 7' and to receive a second reflected received signal characteristic from the lateral surroundings 5. The received signal characteristics received are provided to the measuring apparatus 6.

In step S2 of the proposed method, the second unit 22 identifies a number of echo signals in the respective received signal characteristic (10 in FIG. 5). The second unit 21 preferably identifies all echo signals in the respective received signal characteristic whose signal intensity is above a predetermined or variable threshold (Vth in FIG. 5).

In step S3, the third unit 23 trilates a bearing of a first reflection point 12 in the lateral surroundings 5, from which the chronologically first echo signals in the first and second received signal characteristics were reflected.

In step S4, the fourth unit 24 of the measuring apparatus 6 first selects one of the two received signal characteristics, which is referred to below as the "first" or "selected" received signal characteristic. The fourth unit 24 then selects one of the identified echo signals in the selected received signal characteristic for a double echo determination. According to the proposed method, this selection is made according to at least the bearing of the first reflection point 12, from which the chronologically first echo signals in the two received signal characteristics were reflected, that was trilaterated by the third unit 23 in step S3. Depending on the trilaterated bearing of the first reflection point 12, for example the chronologically first echo signals in the two received signal characteristics or others, for example the chronologically second or the chronologically third echo signals in the two received signal characteristics, are selected for the double echo determination. Criteria for this selection are illustrated below using exemplary embodiments.

In step S5, the fifth unit 25 determines whether the selected echo signal forms a double echo with any further, chronologically subsequent echo signal.

In step S6, the sixth unit 26 determines a height of an object 11 in the lateral surroundings 5 at a reflection point 12 at which the selected echo signal was reflected as being tall if a double echo is detected in step e), and as being short if no double echo is detected.

For details of the double echo and height determination, reference will be made in particular to the description given above with reference to FIGS. 4 to 7, with the proviso that the double echo determination does not necessarily have to be performed on the basis of the chronologically first echo signal, which occurs in the received signal characteristic 10 at the time $t_2$ (FIG. 5), and the chronologically subsequent second echo signal, which occurs in the received signal characteristic 10 at the time $t_6$ (FIG. 5), but rather, depending on the result of the trilateration in step S3, can also be performed on the basis of the chronologically second echo signal, which occurred at the time $t_6$, and a chronologically subsequent, chronologically third echo signal, which is not shown in FIG. 5.

Figure 11:
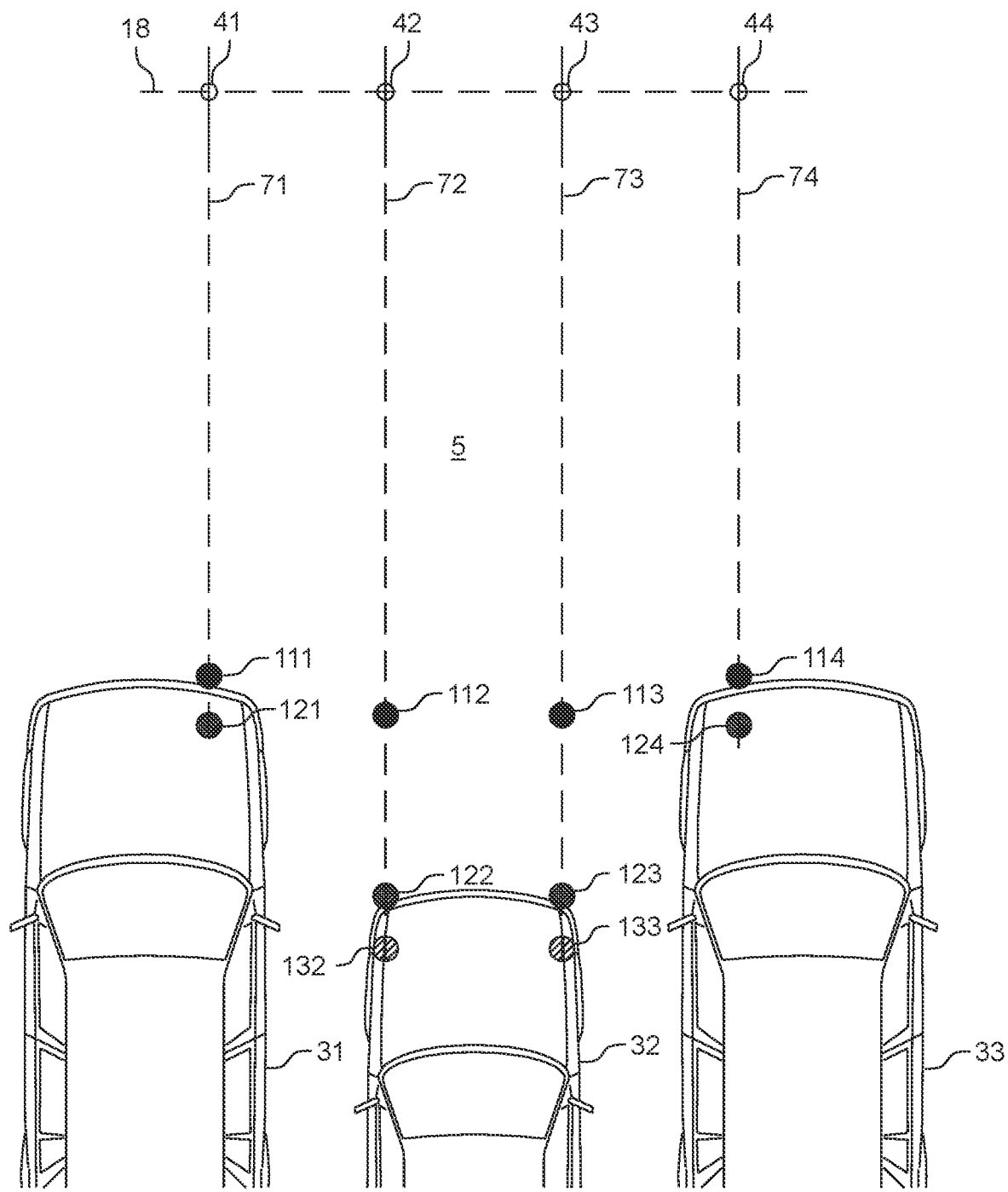
FIG. 11 shows a two-dimensional plot of raw measurement data according to a first exemplary embodiment.

FIG. 11 shows a two-dimensional plot of raw measurement data in lateral surroundings 5 of the vehicle 1 (FIG. 8) according to a first exemplary embodiment.

In the lateral surroundings 5, multiple vehicles 31, 32, 33 (objects, obstacles) are parked laterally beside one another and parallel to the transverse direction. In this case, the front of the vehicle 32 parked in the middle is clearly set back in the transverse direction compared to the fronts of the vehicles 31, 33 parked on either side.

The raw measurement data were obtained by driving the vehicle 1 (FIG. 8), not shown in FIG. 11, with the measuring apparatus 7 (FIG. 1) along a lateral direction of travel 18 and repeatedly carrying out the proposed method at multiple measurement locations 41-44.

The direction of the transverse axes 71-74 of the ultrasonic transceiver 4 (FIG. 8) of the vehicle 1 (FIG. 8) is referred to as the transverse direction in the present case, and the direction of travel of the vehicle 1 (FIG. 8) along the measurement locations 41-44 is referred to as the lateral direction 18.

The respective first transmission and reception positions of the ultrasonic transceiver 4 of the vehicle 1 (FIG. 8), at which a respective first echo signal was transmitted and a first echo signal characteristic was received, are located at the measurement locations 41-44. The associated second transmission and reception positions, at which a respective second transmission signal was transmitted and a second echo signal characteristic was received for the purposes of trilateration, are not shown in FIG. 11. They are located between the respective measurement locations 41-44, in particular halfway between two respective measurement locations 41; 42, 42; 43, 43; 44.

"Raw measurement data" means that raw bearings, unspecified in FIG. 11, of the reflection points 111-133 of the respective echo signals are plotted on the assumption that the first echo signals were reflected along the respective transverse axes 71, 72, 73, 74 of the ultrasonic transceiver 4 (FIG. 1, 8) directly.

Specifically, FIG. 11 shows: the first reflection points 111, 112, 113, 114, the distances of which were determined on the basis of the chronologically first echo signals of the respective first received signal characteristics, as solid dots; the second reflection points 121, 122, 123, 124, the distances of which were determined on the basis of the chronologically second echo signals of the respective first received signal characteristics, as double-hatched dots, and two third reflection points 132, 133, the distances of which were determined on the basis of the chronologically third echo signals in the first received signal characteristic at the second measurement location 42 and in the first received signal characteristic at the third measurement location 43, as single-hatched dots. No chronologically third echo signals were identified at the first measurement location 41 and at the fourth measurement location 44.

The measurement at the measurement location 42 in FIG. 11 deserves particular attention. The reflection point 112 traces back to a chronologically first echo signal that is reflected obliquely from the vehicle 31, which is parked in a manner laterally offset in relation to the measurement location 42, and reaches the ultrasonic transceiver 4 (FIG. 8) at a transmission and reception position of the second measurement location 42 sooner than a chronologically second echo signal reflected from the vehicle 32, which is parked in a set-back position, along the transverse axis 72.

In particular, the non-trilaterated bearing of the first reflection point 112 is significantly more than 34.5 cm away, along the transverse axis 72, from the non-trilaterated bearing of the second reflection point 122 at the same measurement location 42. Thus, the first reflection point 112 and the second reflection point 122 are not recognized as a double echo. This certainly makes it possible to prevent a tall object from being erroneously recognized at the "raw" bearing 112 of the first reflection point. However, the first reflection point 112 shadows the double echo behind it that is formed by the second reflection point 122 and the third reflection point 132. Thus, the vehicle 32 that is set back would not be detected at the second measurement location 42 and there is the risk of the vehicle 32 parked in a set-back position not being detected and determined as a tall object in the lateral surroundings 5. The same applies to the third measurement location 43.

According to the proposed method, this is combated by trilaterating the bearing of a respective first reflection point at which the respective first echo signals were reflected. That is to say that not only is a first transmission signal transmitted and a first received signal characteristic received at a first transmission and reception position (corresponds to the measurement location 41, 42, 43, 44) at the respective measurement location 41, 42, 43, 44, but rather a further transmission signal is transmitted and a second received signal characteristic is received at a second transmission and reception position (not shown; between two measurement locations each) that is offset in the lateral direction. The bearings of the first reflection points 111, 112, 113, 114 are then trilaterated on the basis of the respective chronologically first echo signals in the respective first and second received signal characteristics.

Figure 12:
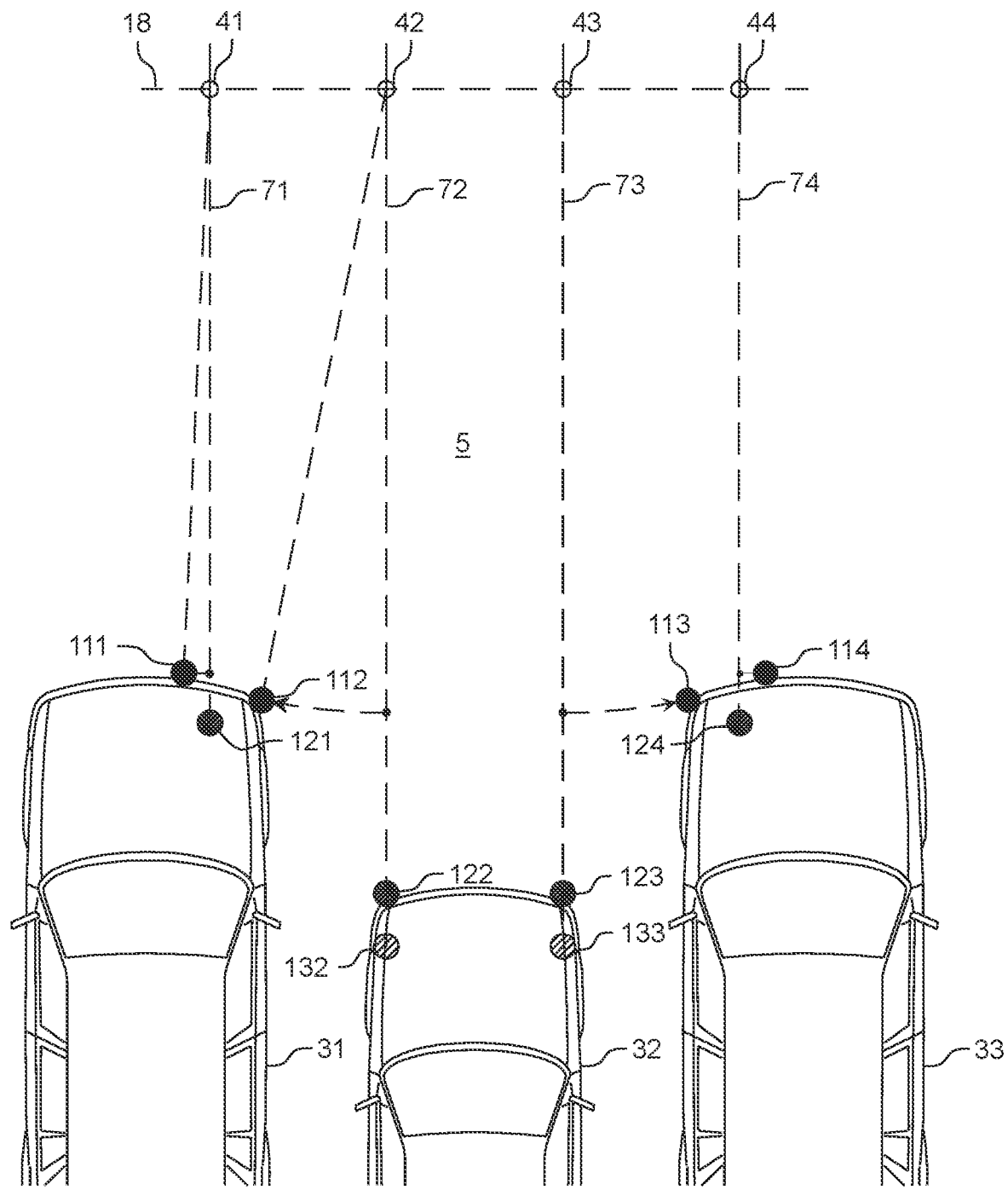
FIG. 12 shows a two-dimensional plot of the measurement data according to the first exemplary embodiment after trilateration of the first reflection points.

FIG. 12 shows a two-dimensional plot of the measurement data according to the first exemplary embodiment after trilateration of the first reflection points 111, 112, 113, 114. The first reflection point 111 at the first measurement location 41 deviates from the transverse axis 71 only slightly and is not considered to be laterally offset. By contrast, the first reflection point 112 at the second measurement location 42 is significantly laterally offset in relation to the transverse axis 72 and is considered to be laterally offset.

According to the present exemplary embodiment of the proposed method, that echo signal which is meant to be used for the double echo determination is selected according to the trilaterated bearing of the respective first reflection point 111-114. Specifically, the respective chronologically first echo signal is selected only if the reflection point 111, 114 associated with the chronologically first echo signal is not considered to be laterally offset. The reflection point 111, 114 is considered not to be laterally offset in particular if it is laterally offset in relation to the associated transverse axis 71, 74 by no more than a predetermined tolerance interval. The predetermined tolerance interval is in particular a predetermined portion or a predetermined multiple of a distance between the first transmission and reception position and the second transmission and reception position at the respective measurement location 41, 44. The predetermined portion or the predetermined multiple can in particular be e.g. one.

However, if the first reflection point 112, 113 is considered to be laterally offset based on the criteria described above, the second exemplary embodiment involves the respective second echo signal 122, 123 being selected without further trilaterations taking place.

Thus, the first exemplary embodiment involves the double echo determination at the first measurement location 41 being performed on the basis of the first reflection point 111 and the second reflection point 121 behind it. At the second measurement location 42, the first reflection point 112 is more than half the distance between the measurement locations 41 and 42 and thus more than once the distance between a first and a second transmission and reception position away from the measurement at the measurement location 41 and/or the measurement at the measurement location 42. The double echo determination at the second measurement location 42 is therefore performed on the basis of the second reflection point 122 and the third reflection point 132 behind it.

It is thus advantageously possible to recognize the third reflection point 132 as a virtual reflection point forming a double echo together with the second reflection point 122. A tall obstacle, namely the vehicle 32 parked in a set-back position, can be recognized as being located at a bearing of the second reflection point 122. Particularly advantageously, this does not require the bearing of the second reflection point 122 and/or the bearing of the third reflection point 132 to be trilaterated; rather, it is sufficient to trilaterate only the bearing of the first reflection point 112. If the first reflection point 112 is laterally offset in relation to the transverse axis 72, it can be assumed that it shadows further reflections occurring along the transverse axis 72. Making such an assumption without also trilaterating the further reflection points 122, 132 can be advantageous because the trilateration of second and further reflection points on the basis of chronologically later echo signals in the respective received signal characteristics can be increasingly afflicted with uncertainties or measurement inaccuracies.

For the third measurement location 43, the double echo determination is accordingly performed on the basis of the second reflection point 123 and the third reflection point 133. For the fourth measurement location 44, the double echo determination is performed on the basis of the first reflection point 114 and the second reflection point 124.

It is thus possible to effectively prevent the vehicle 32 parked in a set-back position from being shadowed by the reflection points 112, 113 on the longer vehicles 31, 33 parked next to it without it having been necessary to trilaterate the bearings of the second or third reflection points 121-124, 132, 133.

If, in the first exemplary embodiment, a double echo is determined in which the front reflection point is a non-trilaterated second reflection point 122, 123, the bearing of the object 32 at the front reflection point 122, 123 of the double echo is determined as the non-trilaterated bearing of the front reflection point 122, 123. That is to say that the bearing of the object 32 is localized on the transverse axis 72, 73 of the respective measurement location 42, 43 at the distance that was determined on the basis of the time difference between the reception of the selected, chronologically second echo signal reflected from the front, second reflection point 122, 123 and the transmission of the associated transmission signal. If a double echo is determined whose front reflection point 111, 114 is a first reflection point 111, 114, the bearing of the object 32 is determined as the trilaterated bearing of the relevant first reflection point 111, 114.

Figure 13:
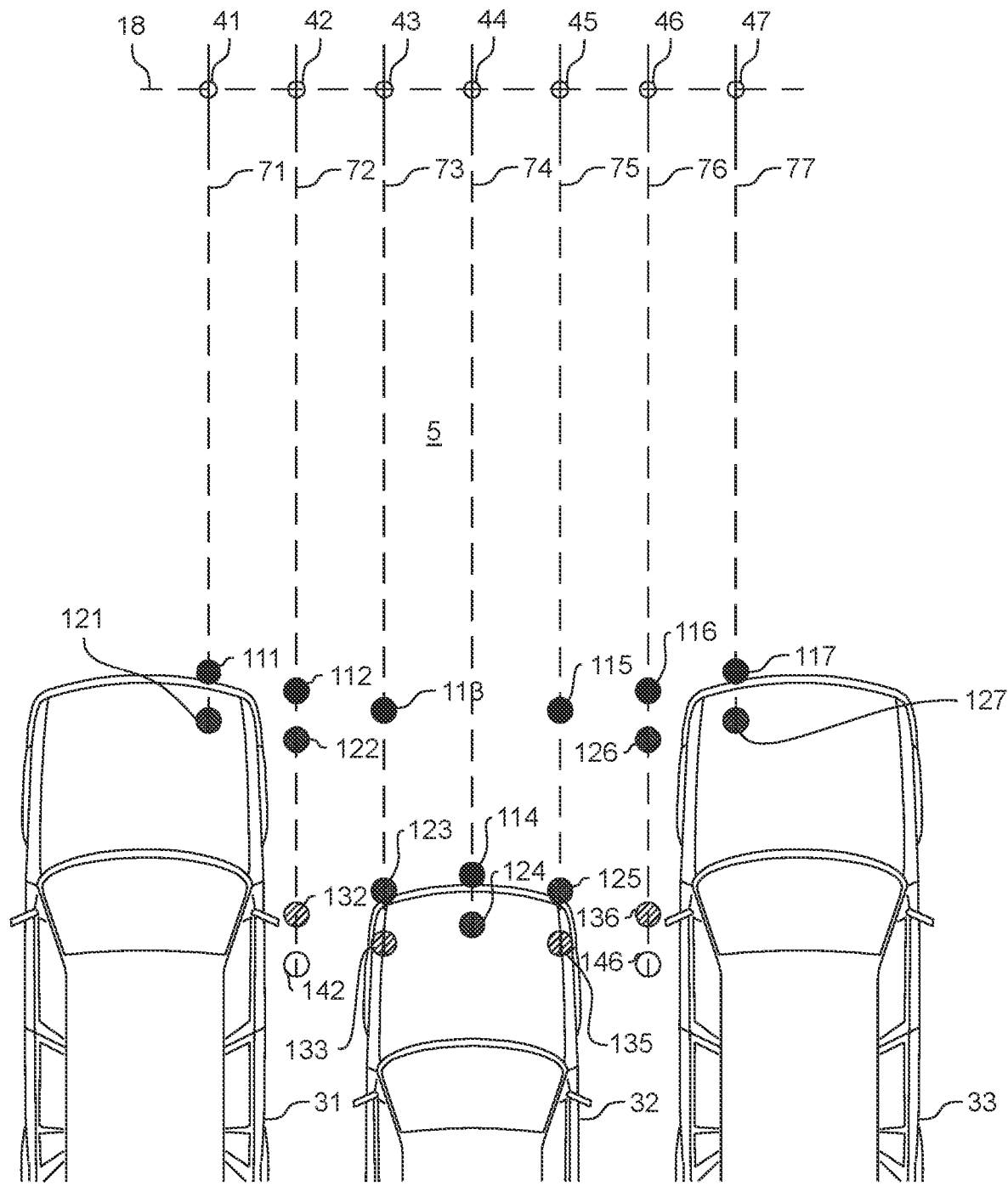
FIG. 13 shows a two-dimensional plot of raw measurement data according to a second exemplary embodiment.

FIG. 13 shows a two-dimensional plot of raw measurement data in lateral surroundings 5 of the vehicle 1 (FIG. 8) according to a second exemplary embodiment. The lateral surroundings of the vehicle 1 are the same as in the first exemplary embodiment, but a measurement interval between the measurement locations 41-47 in the second exemplary embodiment is tighter compared to the first exemplary embodiment from FIG. 11, for example because the vehicle 1 (FIG. 8) travels along the lateral direction of travel 18 at a lower speed.

FIG. 13 shows the non-trilaterated bearings of the first reflection points 111-117, the second reflection points 121-127, the third reflection points 132, 133, 135, 136 and the fourth reflection points 142, 146, from which the respective chronologically first, second, third and fourth echo signals in the two received signal characteristics of a respective measurement at the measurement locations 41-48 were reflected.

Only the pair consisting of the non-trilaterated first and second reflection points 114, 124 at the fourth measurement position 44 forms a non-shadowed double echo, which indicates the vehicle 31 parked in a set-back position. The remaining reflection points 132, 123, 125, 136, 142, 133, 135, 146 that can be attributed to the vehicle 32 parked in a set-back position are shadowed by reflection points 112, 122, 113, 115, 116, 126 on the longer vehicles 31, 33, which are parked in a laterally offset position, the latter points being situated further forward in the transverse direction.

According to the second exemplary embodiment, the bearings of all identified first, second, third and fourth reflection points 111-146 are trilaterated.

Figure 14:
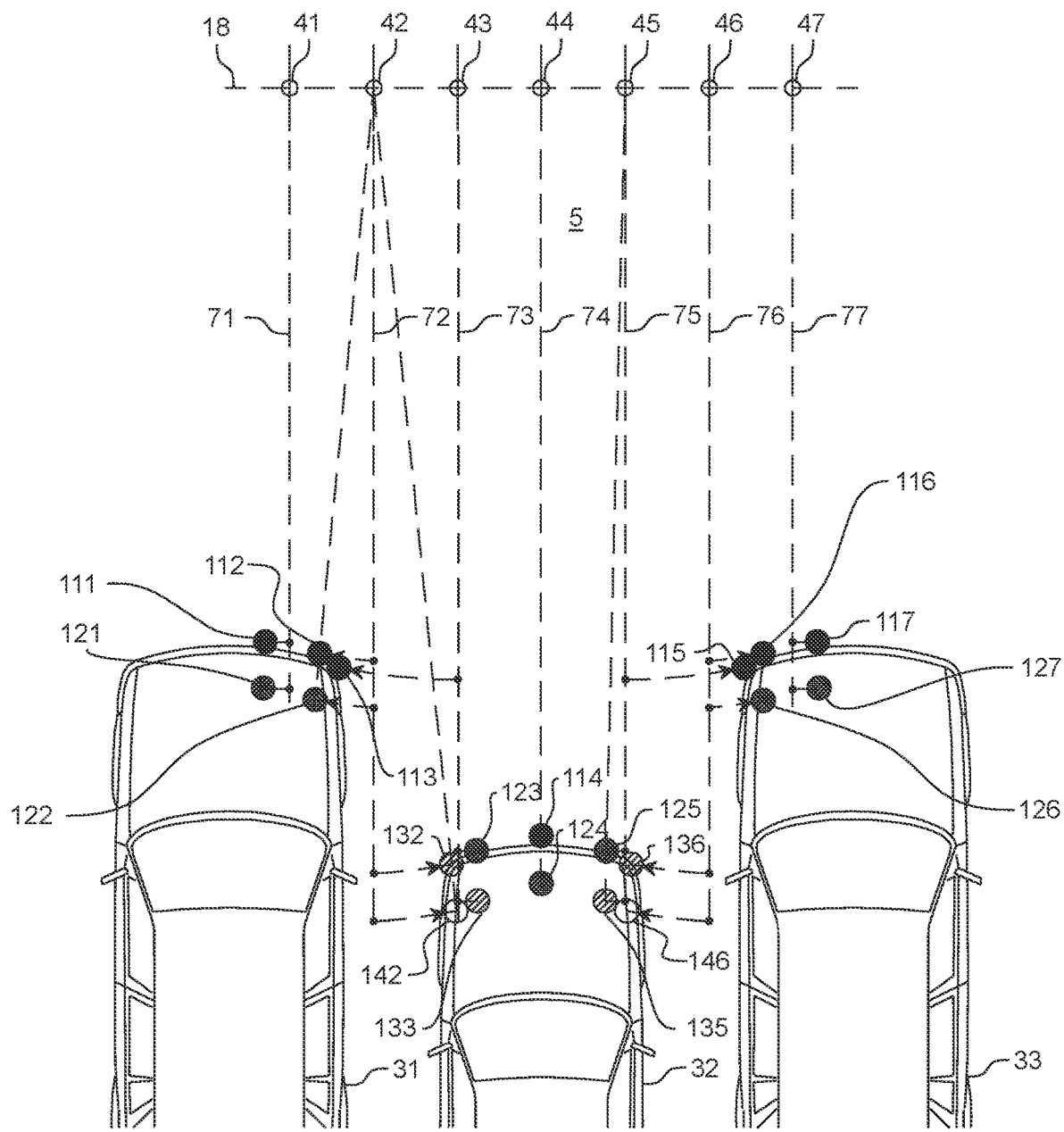
FIG. 14 shows a two-dimensional plot of the measurement data according to the second exemplary embodiment after trilateration of all reflection points.

FIG. 14 shows a two-dimensional plot of the measurement data after trilateration of the reflection points 111-146 on the basis of the respective associated echo signals according to the second exemplary embodiment. A cleaned-up picture is obtained in which the vehicle 32 parked in a set-back position is no longer shadowed by the vehicles 31 and 33 parked next to it.

According to the second exemplary embodiment, at least one selected reflection point and a respective chronologically subsequent reflection point are selected for the double echo determination for each of the measurement locations 41-47 according to the bearings of the relevant reflection points that were trilaterated during the respective measurement.

It will be noted that a speed of travel of the vehicle 1 (FIG. 8) is lower in the second exemplary embodiment than in the first exemplary embodiment; accordingly, a distance between adjacent measurement locations 41-47 is shorter and thus a distance between respective first and second transmission and reception positions is also shorter for a respective measurement. Accordingly, a tolerance range for a respective determination of whether a respective trilaterated bearing of one of the reflection points 111-146 is considered to be laterally offset can be smaller for the second exemplary embodiment than in the first exemplary embodiment. In particular, the tolerance range for a respective determination of whether a respective trilaterated bearing of one of the reflection points 111-146 is considered to be laterally offset can be selected on the basis of the speed of travel of the vehicle 1 (FIG. 8).

In a first variant of the second exemplary embodiment, only those reflection points that, according to the principles explained using the first exemplary embodiment, are not considered to be laterally offset in relation to the respective associated transverse axis 71-77 are selected for a double echo determination. In FIG. 14, these are the first reflection points 111, 114 and 117 and the second reflection points 123, 125.

Furthermore, in a development of the first variant, another criterion for determining the presence of a double echo is that even the reflection point 121, 124, 127, 133, 135 that is chronologically subsequent to the selected reflection point 111, 114, 117, 123, 125 is not considered to be laterally offset in relation to the respective transverse axis 71, 73, 74, 75, 77. This is the case in all of the cited examples.

Thus, the pairs consisting of the first and second reflection points 111; 121, 114; 124 and 117; 127 and the pairs consisting of the second and third reflection points 123; 133, 125; 135 can be used to determine a double echo in each case.

In a second variant of the second exemplary embodiment, multiple, preferably all, reflection points 111-146 are selected for a double echo determination. However, a further criterion for determining the presence of a double echo is that the reflection point 111-146 that is chronologically subsequent to the selected reflection point 111-146 is not considered to be laterally offset in relation to the respective selected reflection point 111-146.

According to these principles, the following double echoes can be determined in FIG. 14 from a selected reflection point and a reflection point that is chronologically subsequent during a respective measurement, i.e. that is arranged further back in FIG. 14: first reflection points 111, 112, 114, 116, 117 with the respective subsequent second reflection points 121, 122, 124, 126, 127; second reflection points 123, 125 with the respective chronologically subsequent third reflection points 133, 135; and third reflection points 132, 136 with the respective chronologically subsequent fourth reflection points 142, 146.

In the second variant of the second exemplary embodiment, the bearings and heights of the parked vehicles 31, 32, 33 can accordingly be correctly determined using a total of nine bearings in the lateral surroundings 5, namely using the bearings of the reflection points 111, 112, 132, 123, 114, 125, 136, 116 and 117; of these nine bearings, eight bearings were initially shadowed and have been made visible by the proposed method.

As has been described on the basis of several exemplary embodiments, the proposed method enables shadowed double echoes to be made visible. This allows a number of measurement points containing height and bearing information in the lateral surroundings 5 to be increased and the lateral surroundings 5 to be measured with greater accuracy.

After the lateral surroundings 5 have been measured by repeatedly performing the proposed method, the parking assistance system 3 (FIG. 1) of the vehicle 1 (FIG. 1) can determine a parking space in the lateral surroundings 5 that is free of objects 31, 32, 33 determined as being tall (FIGS. 11-14) and can park the vehicle in the determined parking space. The proposed method thus also facilitates safer, collision-free parking of the vehicle 1 with the proposed measuring device 6 (FIG. 1, 10).

Although the present invention has been described on the basis of exemplary embodiments, it may be modified in many ways.

FIG. 1 shows the measuring apparatus 6 as part of the parking assistance system 3. However, as an alternative thereto, the measuring apparatus 6 may also be arranged separately in the vehicle 1. The measuring apparatus 6 may also be integrated with the ultrasonic transceiver 4 to form a unit.

The proposed teaching has been described on the basis of the simplifying assumption that the vehicle 1 and the ultrasonic transceiver 4 are located at one and the same transmission and reception position when transmitting a transmission signal and throughout reception of the received signal characteristic, then travel on to a next transmission and reception position, where they perform stationary transmission and reception again. However, it goes without saying that the vehicle 1 may travel along the lateral direction 18 preferably at a uniform speed of travel. In this case, the transmission position of the transmission signal differs from the respective reception positions of respective echo signals in the received echo signal characteristic. Appropriate adaptation of the geometric, trigonometric or mathematical observations disclosed here presents no difficulty for a person skilled in the art.

LIST OF REFERENCE SIGNS

1, 1' vehicle
2 surroundings
3 parking assistance system
4, 4' ultrasonic transceiver
5 lateral surroundings
6 measuring apparatus
7 transverse axis
8 horizontal characteristic of the transmission signal intensity
9 vertical characteristic of the transmission signal intensity
10 received signal characteristic
11 parked other vehicle
12 first point, first reflection point
13 second point
14 third point
15 ground
16 virtual reflection point, second reflection point
17 curb
18 lateral direction
19, 19' circle
21-26 first to sixth units
31-33 obstacle, object, parked vehicle
41-47 first to fourth measurement locations
71-77 first to seventh transverse axes
111-146 reflection points
$t_0$-$t_6$ times
d, d' distances
$V_{th}$ threshold
S1-S6 method steps

The invention claimed is:

1. A method for measuring lateral surroundings of a vehicle provided with at least one lateral ultrasonic transceiver, the method comprising:

a) actuating the at least one ultrasonic transceiver at at least two transmission and reception positions along a lateral direction, which is a direction of travel of the vehicle, for the purpose of transmitting a respective transmission signal in a transverse direction across the direction of travel and receiving a respective received signal characteristic reflected from the lateral surroundings;
b) identifying a number of echo signals in the respective received signal characteristic;
c) trilaterating a bearing of a first reflection point in the lateral surroundings, from which the chronologically first echo signals in the respective received signal characteristic were reflected;
d) selecting, from the number of echo signals in one of the received signal characteristics, an echo signal for a double echo determination according to at least the bearing of the first reflection point relating to the chronologically first echo signals that was trilaterated in step c);
e) determining whether the selected echo signal forms a double echo with any further, chronologically subsequent echo signal; and
f) determining a height of an object in the lateral surroundings at a reflection point at which the selected echo signal was reflected as being tall if a double echo is detected in step e), and as being short if no double echo is detected.

2. The method as claimed in claim 1, wherein step c) comprises trilaterating at least one bearing of a second reflection point in the lateral surroundings, from which the chronologically second echo signals in the respective received signal characteristic were reflected, and wherein the selection of an echo signal for a double echo determination in step d) and/or the determination of whether the selected echo signal forms a double echo with a further, chronologically subsequent, echo signal in step e) is performed according to the bearing of the reflection point of the selected echo signal that was trilaterated in step c) and/or according to the bearing of the reflection point of the chronologically subsequent echo signal that was trilaterated in step c).

3. The method as claimed in claim 2, wherein step d) comprises selecting, for a respective double echo determination, an echo signal in the one received signal characteristic for whose associated reflection point a bearing that is not laterally offset in relation to the associated transmission and reception position of the one received signal characteristic was trilaterated in step c).

4. The method as claimed in claim 2, wherein step e) comprises detecting the double echo only on the condition that respective bearings that are not laterally offset in relation to the associated transmission and reception position of the one received signal characteristic were trilaterated in step c) for the reflection points associated with the selected echo signal and the chronologically subsequent echo signal.

5. The method as claimed in claim 2, wherein step e) comprises detecting the double echo only on the condition that a bearing that is not laterally offset in relation to a bearing that was trilaterated in step c) for the reflection point, associated with the selected echo signal was trilaterated in step c) for the reflection point associated with the chronologically subsequent echo signal.

6. The method as claimed in claim 1, wherein step d) comprises selecting the chronologically second echo signal in the one received signal characteristic for a double echo determination if the bearing of the first reflection point that was trilaterated in step c) is laterally offset in relation to the associated transmission and reception position of the one received signal characteristic; and otherwise selecting the chronologically first echo signal.

7. The method as claimed in claim 1, wherein step e) comprises detecting the double echo only if the interval of time between the selected echo signal and the chronologically subsequent echo signal in the one received signal characteristic is less than a predetermined maximum interval.

8. The method as claimed in claim 1, wherein step e) comprises detecting the double echo only if a signal strength of the chronologically subsequent echo signal is not higher than a signal strength of the selected echo signal and deviates from the signal strength of the selected echo signal by no more than a predetermined factor.

9. The method as claimed in claim 1, wherein a tolerance range for a respective determination of whether or not a respective trilaterated bearing is laterally offset is selected on the basis of a speed of travel of the vehicle.

10. The method as claimed in claim 1, further comprising:
g) determining a bearing of the object whose height was determined in step f) on the basis of a time difference between the reception of the selected echo signal in the one received signal characteristic and the transmission of the associated transmission signal, and on the basis of the transverse direction across the direction of travel of the vehicle.

11. The method as claimed in claim 1, further comprising:
g) determining a bearing of the object whose height was determined in step f) as the bearing of the reflection point from which the selected echo signal was reflected that was trilaterated in step c).

12. A method for parking a vehicle provided with at least one lateral ultrasonic transceiver and a parking assistance system, comprising:
performing the method as claimed in claim 1 repeatedly at multiple locations along a direction of travel parallel to lateral surroundings of the vehicle in order to determine the bearings and heights of one or more objects in the lateral surroundings of the vehicle;
determining a parking space in the lateral surroundings that is free of objects that were determined as being tall; and
parking the vehicle in the parking space using the parking assistance system.

13. A non-transitory computer program product comprising instructions that, when executed by a computer apparatus, cause the latter to carry out the method as claimed in claim 1.

14. A measuring apparatus for a parking assistance system of a vehicle provided with at least one lateral ultrasonic transceiver, wherein the measuring apparatus is configured to measure lateral surroundings of the vehicle and comprises:
a) a transceiver actuation unit configured to actuate the at least one ultrasonic transceiver at at least two transmission and reception positions along a lateral direction, which is a direction of travel of the vehicle, for the purpose of transmitting a respective transmission signal in a transverse direction across the direction of travel and receiving a respective received signal characteristic reflected from the lateral surroundings;

b) an echo identification unit configured to identify a number of echo signals in the respective received signal characteristic;
c) a trilateration unit configured to trilaterate a bearing of a first reflection point in the lateral surroundings, from which the chronologically first echo signals in the respective received signal characteristic were reflected;
d) an echo selection unit configured to select, from the number of echo signals in one of the received signal characteristics, a selected echo signal for a double echo determination according to at least the bearing of the first reflection point relating to the chronologically first echo signals that was trilaterated by the trilateration unit;
e) a double echo identification unit configured to determine whether the selected echo signal forms a double echo with any further, chronologically subsequent echo signal; and
f) a height determination unit configured to determine a height of an object in the lateral surroundings at a reflection point at which the selected echo signal was reflected as being tall if the double echo identification unit has detected a double echo, and as being short if the double echo identification unit has detected no double echo.

15. A vehicle having a parking assistance system that is configured for semi- or fully autonomous driving of the vehicle, wherein the vehicle and/or the parking assistance system comprises a measuring apparatus as claimed in claim 14.

* * * * *